United States Patent
Kozu et al.

(10) Patent No.: US 7,846,577 B2
(45) Date of Patent: Dec. 7, 2010

(54) BATTERY PACK

(75) Inventors: Katsumi Kozu, Hyogo (JP); Toshihiko Ichinose, Nara (JP); So Kuranaka, Osaka (JP)

(73) Assignee: Panasonic Corporation, Osaka (JP)

( * ) Notice: Subject to any disclaimer, the term of this patent is extended or adjusted under 35 U.S.C. 154(b) by 818 days.

(21) Appl. No.: 10/574,349

(22) PCT Filed: Jan. 18, 2005

(86) PCT No.: PCT/JP2005/000540

§ 371 (c)(1),
(2), (4) Date: Apr. 3, 2006

(87) PCT Pub. No.: WO2005/069408

PCT Pub. Date: Jul. 28, 2005

(65) Prior Publication Data

US 2008/0233475 A1    Sep. 25, 2008

(30) Foreign Application Priority Data

Jan. 20, 2004  (JP) .............................. 2004-011652
Jan. 20, 2004  (JP) .............................. 2004-011653

(51) Int. Cl.
*H01M 6/12* (2006.01)
(52) U.S. Cl. .................. 429/162; 429/129; 429/163
(58) Field of Classification Search .................. 429/159
See application file for complete search history.

(56) References Cited

U.S. PATENT DOCUMENTS 6,275,003 B1 * 8/2001 Marukawa et al. .......... 320/116

(Continued)

FOREIGN PATENT DOCUMENTS

CN        1465109       12/2003

(Continued)

OTHER PUBLICATIONS

English language Abstract of JP11-354089, Dec. 24, 1999.

(Continued)

*Primary Examiner*—Dah-Wei D Yuan
*Assistant Examiner*—Patricia Davis
(74) *Attorney, Agent, or Firm*—Greenblum & Bernstein P.L.C.

(57) ABSTRACT

A battery pack is provided, in which a plurality of rechargeable batteries are held by a center frame, a bottom-side frame, and a terminal-side frame in a parallel spaced relationship, the plurality of rechargeable batteries being connected in series and integrated with a circuit substrate by mounting the circuit substrate on the terminal-side frame, the circuit substrate being provided with a resin mold, whereby the battery pack is free of damage to electrical circuit parts even in the event of entrance of water or dust through vents that are provided for suppressing temperature rise of the rechargeable batteries. The plurality of rechargeable batteries are connected in series by joining connection plates to the positive and negative electrode terminals formed on the sealing plates of plurality of the rechargeable batteries that are held by the terminal-side frame, and connection projections formed to each connection plate are fitted in respective connection holes in the circuit substrate so as to integrate the circuit substrate with the rechargeable batteries, whereby the wiring for connecting each of the rechargeable batteries to the circuit substrate is made simple.

6 Claims, 10 Drawing Sheets

U.S. PATENT DOCUMENTS

| | | |
|---|---|---|
| 6,455,186 B1 | 9/2002 | Moores et al. |
| 6,858,344 B2 | 2/2005 | Marukawa et al. |
| 6,861,821 B2 * | 3/2005 | Masumoto et al. .......... 320/107 |
| 6,884,540 B2 | 4/2005 | Chikada |
| 2003/0146734 A1 | 8/2003 | Kozu et al. |
| 2003/0180582 A1 | 9/2003 | Masumoto et al. |
| 2004/0058233 A1 * | 3/2004 | Hamada et al. ............. 429/159 |

FOREIGN PATENT DOCUMENTS

| | | |
|---|---|---|
| DE | 10056370 | 7/2001 |
| JP | 11-026029 | 1/1999 |
| JP | 11-162423 | 6/1999 |
| JP | 11-288744 | 10/1999 |
| JP | 11-354089 | 12/1999 |
| JP | 11354089 A * | 12/1999 |
| JP | 11354089 A * | 12/1999 |
| JP | 2000-012107 | 1/2000 |
| JP | 2000-149889 | 5/2000 |
| JP | 2001-143678 | 5/2001 |
| JP | 2001-313015 | 11/2001 |
| JP | 2003-045383 | 2/2003 |
| JP | 2003-162987 | 6/2003 |
| JP | 2003-323870 | 11/2003 |
| WO | WO03003485 * | 1/2003 |

OTHER PUBLICATIONS

English Language Abstract of JP 2001-313015, Dec. 24, 1999.
English Language Abstract of JP 2003-162987, Jun. 6, 2003.
English Language Abstract of JP 11-288744, Oct. 19, 1999.
English Language Abstract of JP 2001-143678, May 25, 2001.

* cited by examiner

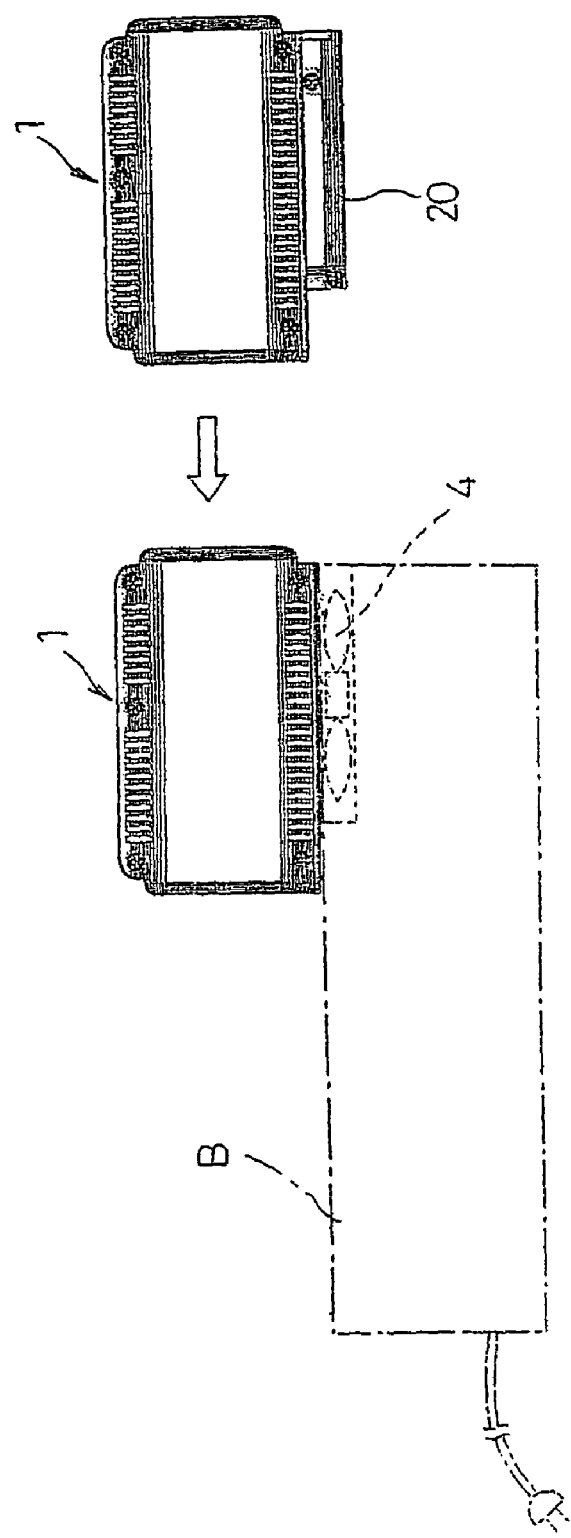

BATTERY PACK

TECHNICAL FIELD

The present invention relates to a battery pack suitably used as a battery power source of an electric tool such as an electric drill.

BACKGROUND ART

With the growing demands for more powerful electric tools, battery packs structured as the battery power source of such tools are required to have a large power output capacity. Battery packs composed of a large number of rechargeable batteries accommodated in a pack case have been used to satisfy this requirement. However, as the electric tools are hand-held when operated, smaller and lighter battery packs are sought after. Nickel cadmium rechargeable batteries or nickel metal hydride rechargeable batteries are generally used for the battery packs. But these are not sufficiently satisfactory in respect of weight energy density and volume energy density, and had the problem of poor operability of the electric tool because of the large and heavy battery pack that requires a large number of rechargeable batteries, and the problem of poor heat dissipation because of the multiple, densely packed batteries.

Non-aqueous electrolyte rechargeable batteries such as lithium ion rechargeable batteries are known, which have superior weight and volume energy density as compared to the above-mentioned nickel cadmium rechargeable batteries or nickel metal hydride rechargeable batteries. By using such batteries, the battery pack can be made smaller and lighter with the same output power. Flat prismatic lithium ion rechargeable batteries, in particular, can more advantageously be used than cylindrical batteries to make a battery pack with superior space efficiency.

However, because rechargeable batteries with non-aqueous electrolyte such as lithium ion rechargeable batteries tend to deteriorate or generate heat when subjected to overcharge and overdischarge, they need a battery protection circuit and/or charge/discharge control circuit. Therefore a battery pack is usually formed by accommodating a circuit substrate with these circuits formed thereon together with the rechargeable batteries within a pack case. Many design proposals have been made for such battery packs with rechargeable batteries and a circuit substrate accommodated inside a pack case, and to give an example, a battery pack shown in the following patent document 1 is known.

Document 1: Japanese Patent Laid-Open Publication No. 2001-313015.

However, with a battery pack that is used for a relatively high-power application such as a battery power source of an electric tool, because of the use of a large number of rechargeable batteries, there was a problem that the wiring structure for connecting each one of the rechargeable batteries to the circuit substrate was complex. Moreover, electric tools are often used in an environment where they are exposed to dust or water and for that reason they need a structure for preventing entrance of water, moisture, and dust into electrical circuit parts such as a circuit substrate. But further requirements are that the heat dissipation properties of the rechargeable batteries must not be deteriorated and that the battery pack must not be oversized because of such protective structure.

Accordingly, an object of the present invention is to provide a battery pack having a simple connection structure for integrating a circuit substrate with a plurality of rechargeable batteries and a structure for preventing entrance of water, moisture, and dust into electrical circuit parts.

DISCLOSURE OF THE INVENTION

To achieve the above object, the battery pack according to the present invention includes a plurality of flat prismatic rechargeable batteries, each of which is formed by accommodating an electrode assembly and a liquid electrolyte in a battery case and sealing an open end of the case with a sealing plate, an electrode terminal being provided in the sealing plate; a circuit substrate formed with a battery management circuit for managing the operating state of each rechargeable battery; and a pack case for accommodating the rechargeable batteries and the circuit substrate, wherein the plurality of rechargeable batteries are held by a frame in such an arrangement that they are oriented in the same direction on their sealing-plate side, whereby the plurality of rechargeable batteries are integrated; the circuit substrate is mounted to a frame for holding the sealing-plate side of the plurality of rechargeable batteries; and a resin mold is provided for covering a necessary surface of the circuit substrate with a resin after the circuit substrate is electrically connected to the rechargeable batteries and to input and output terminals.

With this structure, the plurality of rechargeable batteries are integrated by the frame in a parallel spaced relationship, and the circuit substrate is mounted to the frame for holding the sealing-plate side of the rechargeable batteries, i.e., the plurality of rechargeable batteries and the circuit substrate are made in one piece, and the circuit substrate is provided with a resin mold. Therefore the positive and negative electrode terminals of each rechargeable battery and the circuit substrate are separated from each other. Because the circuit substrate is covered by the resin mold, the electrical circuit parts are protected from dust or water that may enter into the pack case through a vent or the like that communicates with outside for cooling the rechargeable batteries.

Further, the battery pack according to the present invention includes a plurality of rechargeable batteries, each of which is formed by accommodating an electrode assembly and a liquid electrolyte in a battery case and sealing an open end of the case with a sealing plate, an electrode terminal being provided in the sealing plate; a circuit substrate formed with a battery management circuit for managing the operating state of each rechargeable battery; and a pack case for accommodating the rechargeable batteries and the circuit substrate, wherein the plurality of rechargeable batteries are held by a frame in such an arrangement that they are oriented in the same direction on their sealing-plate side; the plurality of rechargeable batteries are connected in series and/or parallel by joining connection plates to the electrode terminals of each rechargeable battery; and the circuit substrate is mounted such that connection projections formed to the connection plates are inserted into connection holes of the circuit substrate so that the connection projections are joined to the circuit substrate.

With this structure, the plurality of rechargeable batteries are integrated by the frame, and when the connection plates for connecting the plurality of rechargeable batteries in series and/or parallel are joined to the positive and negative electrode terminals formed in the sealing plates, which are located inside the frame for holding the sealing-plate side of the rechargeable batteries, to join the circuit substrate to the connection projections formed to the connection plates, the rechargeable batteries and the circuit substrate are made in one piece and each rechargeable battery is connected to the circuit substrate, so that the battery management circuit formed on the circuit substrate detects a voltage of each rechargeable battery and executes control of charge and discharge or controls of battery protection and the like. With this structure, lead wires are not necessary for connecting the plurality of rechargeable batteries and the circuit substrate, and the electrical connection is established by the structure itself for integrating the plurality of rechargeable batteries and the circuit substrate.

BRIEF DESCRIPTION OF THE DRAWINGS

FIG. 10 is a side view for explaining how the battery pack is attached to a charger.

BEST MODE FOR CARRYING OUT THE INVENTION

Figure 1:
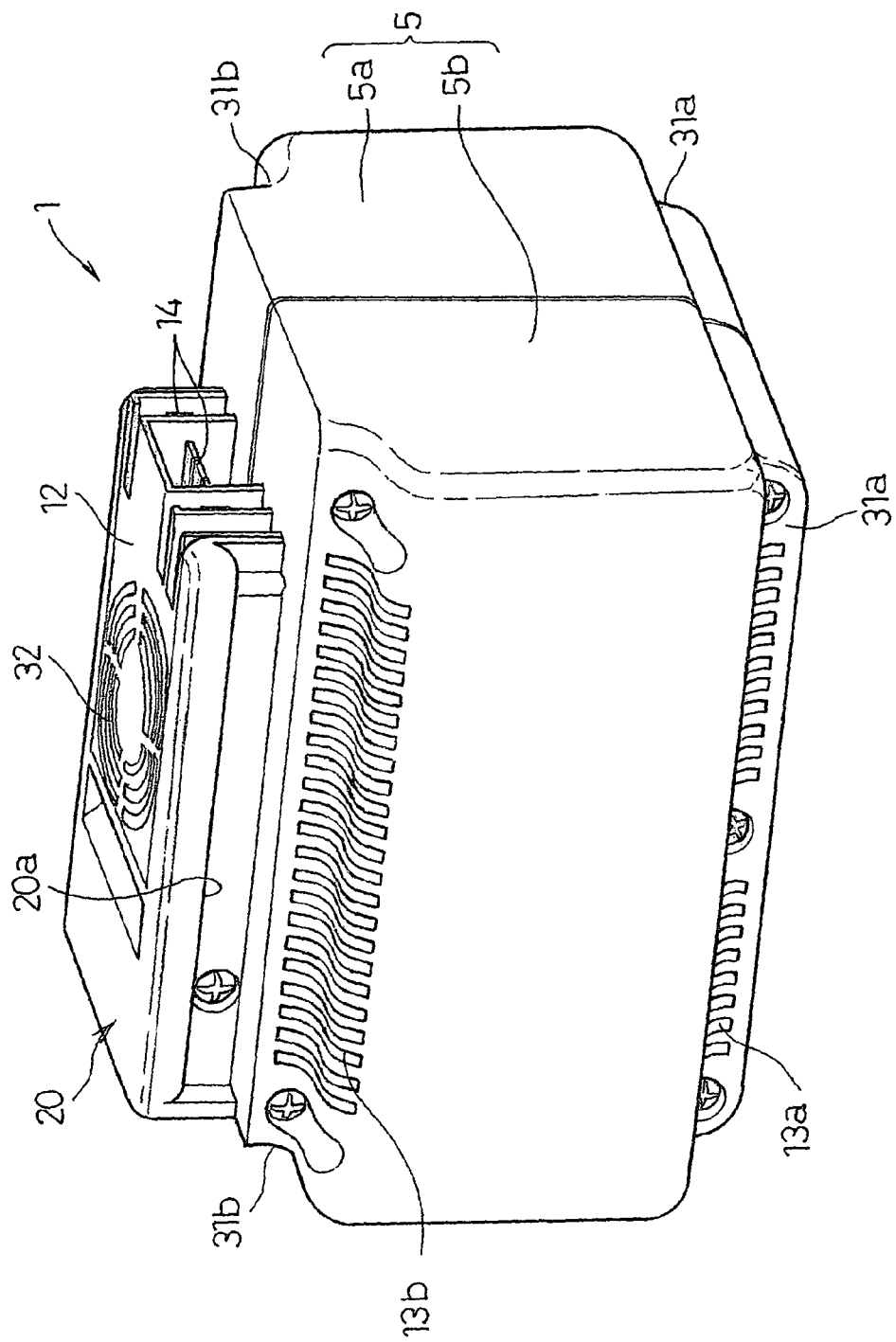
FIG. 1 is a perspective view illustrating the external appearance and structure of a battery pack according to an embodiment.

Preferred embodiments of the present invention will be hereinafter described with reference to FIG. 1 to FIG. 10. FIG. 1 illustrates a battery pack 1 according to one embodiment, which is attached to an electric tool A as its drive power source, as shown in FIG. 9. When the battery capacity has decreased after using the electric tool A, the battery pack is removed from the electric tool A and attached to a charger B as shown in FIG. 10, whereby it is charged. To attach the battery pack 1 to the electric tool A or to the charger B, it is pressed into the electric tool A or the charger B such that protrusions provided on the electric tool A or the charger B fit into slide grooves 20a formed in both side faces of a mounting part 20 provided on top of the pack case 5, whereby connection plugs 14 provided in a connector case 12 held in the center of the mounting part 20 fit into sockets of the electric tool A or the charger B for electrical connection.

Figure 2:
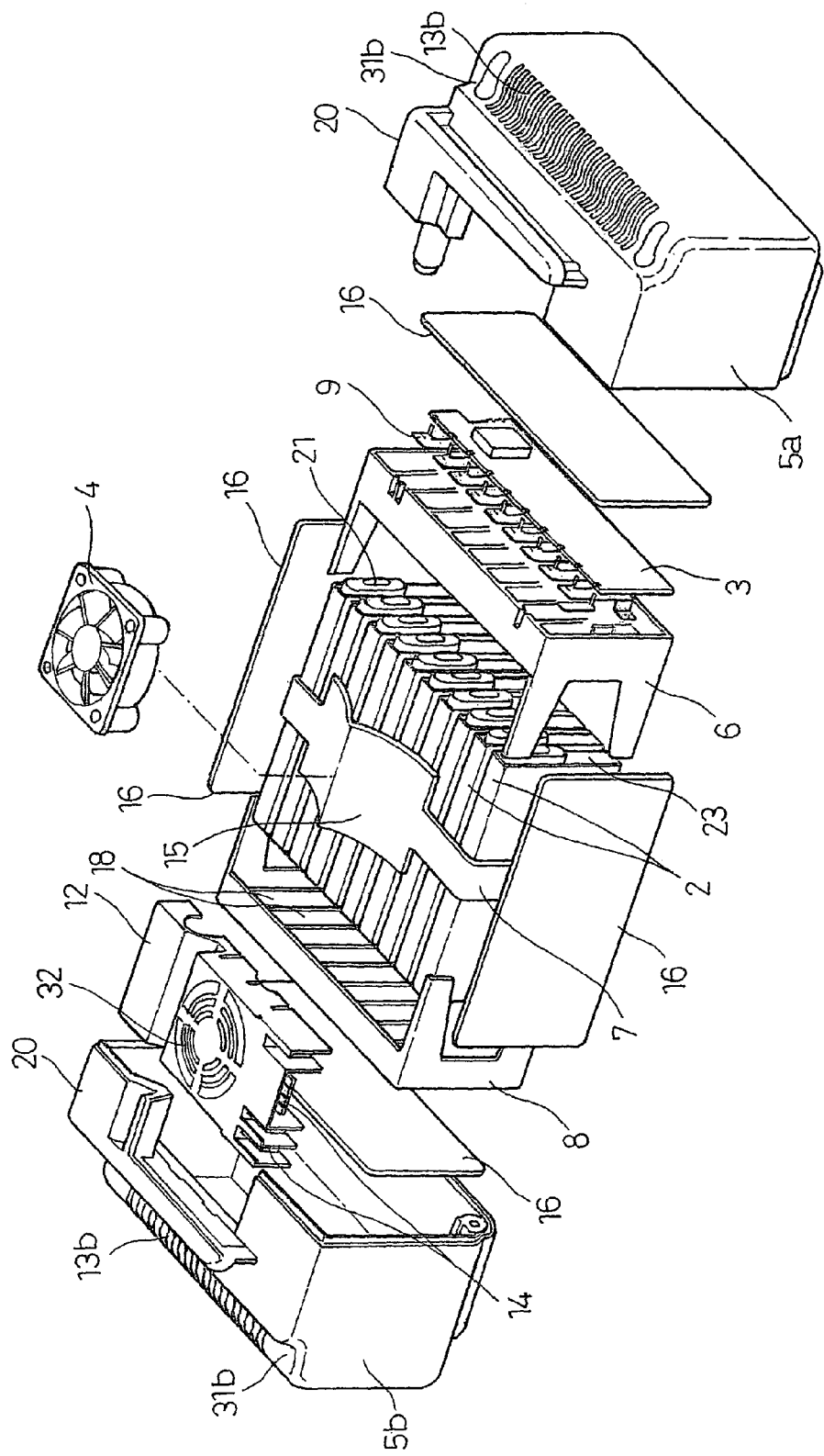
FIG. 2 is an exploded perspective view illustrating the constituent elements of the battery pack.

As shown in an exploded view of FIG. 2, this battery pack 1 includes a pack case 5 that accommodates ten rechargeable batteries 2 and a circuit substrate 3 formed with a battery management circuit for executing control of charge and discharge and control of protection of the rechargeable batteries 2, a blow fan 4 for enhancing heat dissipation of the rechargeable batteries 2 being integrally assembled in the pack case.

A lithium ion rechargeable battery having a flat parallelepiped shape is applied for the rechargeable batteries 2. As shown in FIG. 2, ten such rechargeable batteries 2 are arranged in parallel, their largest flat surfaces being directed orthogonal to the bottom surface of the pack case 5 and opposite each other with a predetermined space therebetween. To keep the ten rechargeable batteries 2 arranged in parallel spaced relationship as described above, the center parts of the rechargeable batteries 2 are held by a center frame 7, which is formed with battery accommodating parts (openings) 17 opened in the shape and dimensions that match the cross section of the lengthwise center of the rechargeable battery 2 at ten locations as shown in FIG. 4, and both the ends of the rechargeable batteries 2 are supported by a terminal-side frame 6 and a bottom-side frame 8, respectively.

Figure 3:
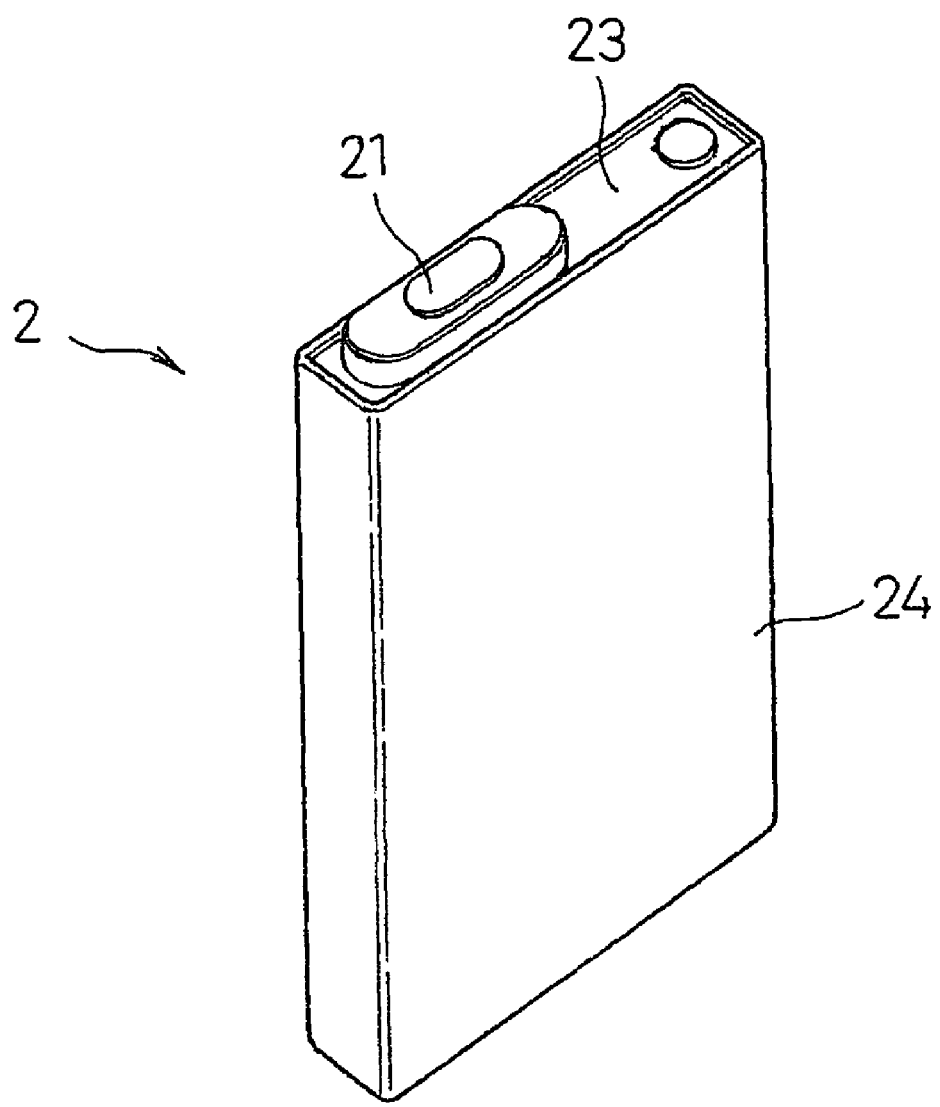
FIG. 3 is a perspective view illustrating the structure of a rechargeable battery applied to the battery pack.

As shown in FIG. 3, the rechargeable battery 2 includes a square tubular battery case 24 with a bottom, which accommodates either a coiled electrode assembly consisting of long strips of coiled positive and negative electrodes with a separator interposed therebetween, or a laminated electrode assembly consisting of a plurality of stacked positive and negative electrodes with separators interposed therebetween, the open end of the battery case 24 being sealed by welding a sealing plate 23 and tightly sealed after injecting liquid electrolyte into the battery case 24. A positive electrode terminal 21 connected to the positive electrode is provided on the sealing plate 23 in an electrically insulated manner, the sealing plate 23 and the battery case 24 forming the negative electrode terminal of the rechargeable battery 2.

When the temperature of the rechargeable battery 2 rises due to a large-current discharge, overcharge, or the like, the battery case 24 swells because of thermal expansion and electrolyte vaporization, and this is most evident in the largest flat surfaces or side faces of the battery case 24. The electrode assembly accommodated in the battery case 24, whether it is a coiled or laminated type, is tightly pressed between the largest flat surfaces on both sides of the battery case 24, in which the positive and negative electrodes are stacked upon one another with the separator therebetween, so that ions moving in the liquid electrolyte, which is impregnated into the separator, travel between the positive and negative electrodes for the charge and discharge reactions. When the battery case 24 swells, the tightly stacked electrodes become loose, and gaps between the electrodes will adversely affect the ion transfer rate and may cause insufficient charge and discharge reactions.

Figure 4:
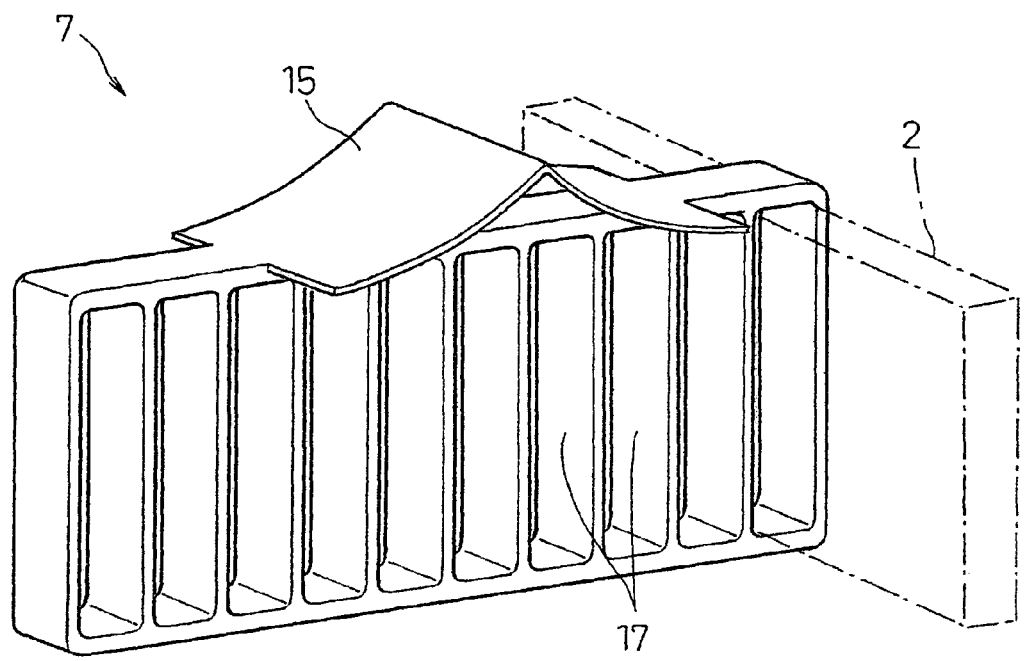
FIG. 4 is a perspective view illustrating the structure of a center frame for holding rechargeable batteries.

As shown in FIG. 4, when ten rechargeable batteries 2 are inserted in their respective battery accommodating parts 17, the center frame 7 holds the rechargeable batteries 2 such as to surround substantially the central parts of the battery cases 24, so that the rechargeable batteries 2 are tightly held and never swells. Incidentally, the rechargeable battery 2 applied in this embodiment has a short side width of 10 mm, while the short side width of the battery accommodating parts 17 is formed to be 10.4 mm, so that the rechargeable batteries 2 are inserted into the battery accommodating parts 17 smoothly at the time of the assembly. The swelling of the battery cases 24 is restricted by the width of the battery accommodating parts 17, whereby performance degradation of the rechargeable batteries 2 caused by swelling of the battery cases 24 is prevented.

Figure 5A:
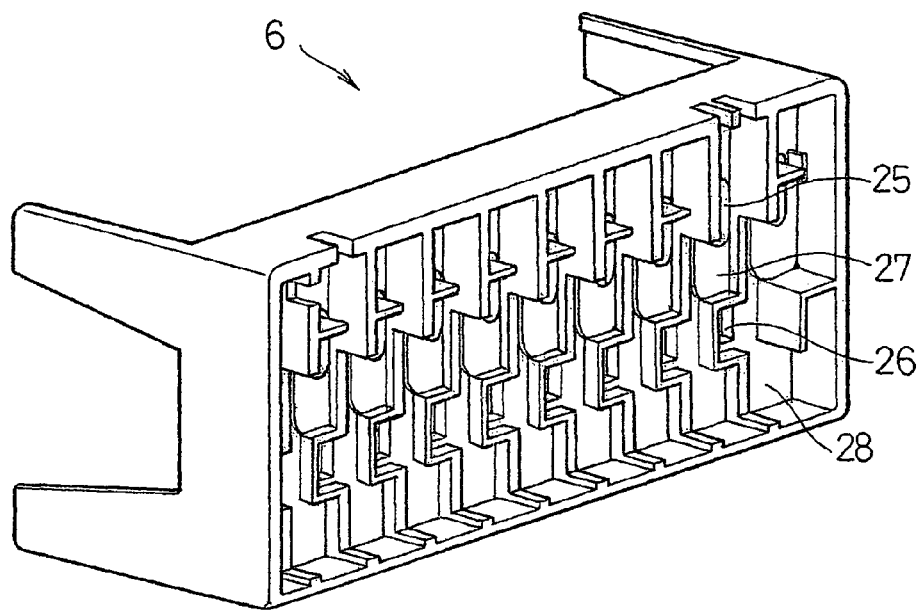
FIG. 5A and FIG. 5B are perspective views illustrating the structure of a terminal-side frame, FIG. 5A showing the outer side and FIG. 5B showing the inner side.
Figure 5B:
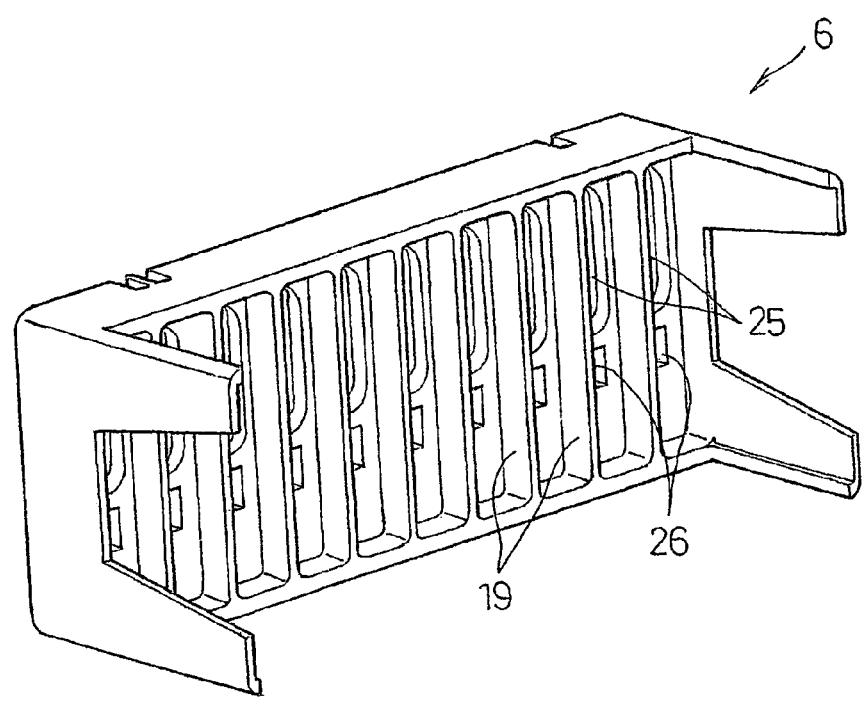

The ten rechargeable batteries 2 are all oriented in the same direction and inserted in respective battery accommodating parts 17 of the center frame 7, and to the bottom side of the rechargeable batteries 2 is attached the bottom-side frame 8, which is formed with parallel-arranged bottom accommodating recesses 18 having the shape and dimensions that match those of the bottom parts of the battery cases 24. To the sealing plate 23 side of the rechargeable batteries 2 is attached the terminal-side frame 6, which is, as shown in FIG. 5B, formed with sealing part accommodating recesses 19 inside for accommodating the sealing plate 23 side of the rechargeable batteries 2. In the bottom of each recess are formed a positive electrode connection window 25 through which the positive electrode terminal 21 extends and a negative electrode connection window 26 for exposing part of the plate surface of the sealing plate 23. On the outer side of this terminal-side frame 6 are formed, as shown in FIG. 5A, a substrate accommodating recess 28 for accommodating the circuit substrate 3, and connection plate accommodating recesses 27 for accommodating series-connection plates 9, a positive electrode connection plate 10, and a negative electrode connection plate 11 for connecting the ten rechargeable batteries 2 in series to each other and to the circuit substrate 3. In the bottom surface of the connection plate accommodating recesses 27 are opened the above-mentioned positive electrode connection window 25 and the negative electrode connection window 26.

Figure 6:
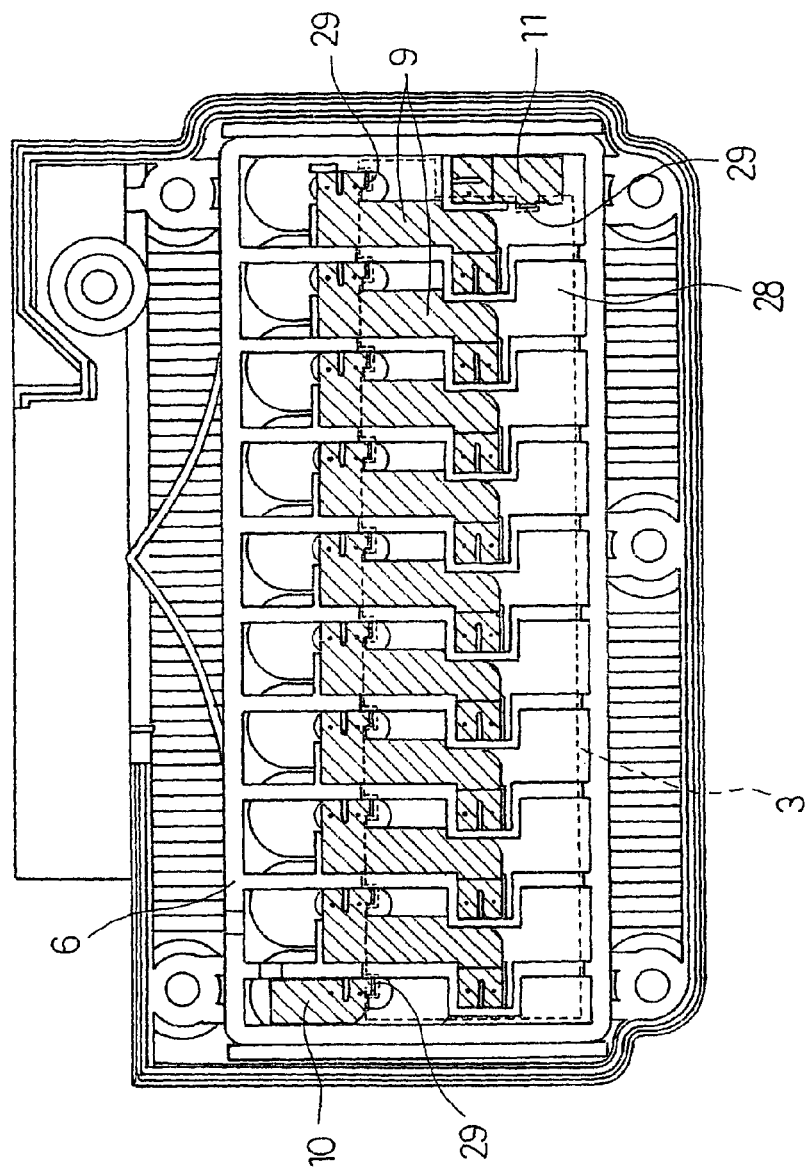
FIG. 6 is a side view illustrating the connection structure of a plurality of rechargeable batteries and a circuit substrate.
Figure 7:
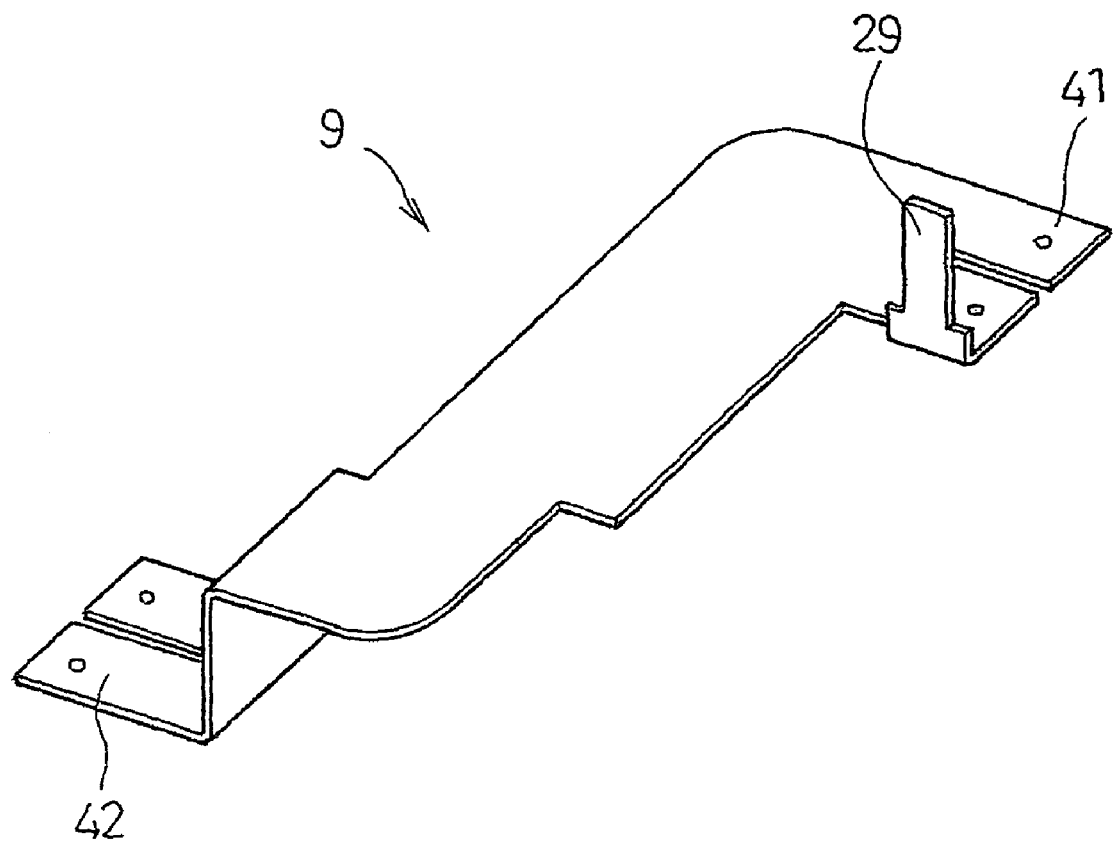
FIG. 7 is a perspective view illustrating the structure of a series-connection plate.

The ten rechargeable batteries 2 are surrounded by the terminal-side frame 6, the center frame 7, and the bottom-side frame 8. After these frames are bonded to each other, the series-connection plate 9 shown in FIG. 7 is bridged across adjacent rechargeable batteries 2 and abutted to the positive electrode terminal 21 and the sealing plate 23 through the positive electrode connection window 25 and the negative electrode connection window 26 as shown in FIG. 6. The positive electrode connection part 41 and the negative electrode connection part 42 are respectively spot-welded to the positive electrode terminal 21 and the sealing plate 23 so as to connect the ten rechargeable batteries 2 in series. To the positive electrode terminal 21 of the rechargeable battery 2 that is at the positive terminal side of the series-connection end is spot-welded the positive electrode connection plate 10, and to the sealing plate 23 of the rechargeable battery 2 that is at the negative terminal side of the series-connection end is spot-welded the negative electrode connection plate 11. FIG. 7 illustrates one example of the series-connection plate 9; a substrate connection projection 29 for connection with the circuit substrate 3 is formed to each of the series-connection plates 9, the positive electrode connection plate 10, and the negative electrode connection plate 11.

After spot-welding the series-connection plates 9, the positive electrode connection plate 10, and the negative electrode connection plate 11 to the ten rechargeable batteries 2, when the circuit substrate 3 is accommodated in the substrate accommodating recess 28 of the terminal-side frame 6, the substrate connection projections 29 formed to the series-connection plates 9, the positive electrode connection plate 10, and the negative electrode connection plate 11 fit into respective connection holes formed in the circuit substrate 3, and they are respectively soldered to the circuit substrate 3. This connection structure enables all the ten rechargeable batteries 2 to be connected to the circuit substrate 3 without having to provide lead wiring for connecting each rechargeable battery 2 to the circuit substrate 3, and the battery voltage across each two adjacent rechargeable batteries 2 is measured based on the voltage across the substrate connection projections 29 in the circuit substrate 3. The battery protection circuit formed on the circuit substrate 3 executes control for protecting the rechargeable batteries 2 from overcharge and overdischarge based on the battery voltage across each two adjacent rechargeable batteries 2, and the charge/discharge control circuit executes control of charge and discharge based on the measurements of the battery voltage and battery temperature.

After the circuit substrate 3 accommodated in the substrate accommodating recess 28 is connected with leads to the blow fan 4 provided in the connector case 12 that is arranged upon the center frame 7 and to the connector plugs 14, the circuit substrate 3 is molded with a resin. Resin molding is a process wherein a molten resin is poured onto and cured on the surface where electronic components have been mounted including the parts where the leads are connected, and the process reinforces the electric insulation of the circuit substrate 3, as well as prevents moisture and water. More preferably, a molten resin should be poured to fill the substrate accommodating recess 28 and cured, so that the entire circuit substrate 3 is encapsulated in the resin, and the circuit substrate 3 and the terminal-side frame 6 are resin-molded. The resin molding provides a moisture-proof barrier for the electronic components mounted on the circuit substrate 3, and in addition, it prevents electrical trouble caused by water that may enter through vents 13a and 13b formed in the pack case 5.

After the rechargeable batteries 2 and the circuit substrate 3 are assembled together as described above, protection plates 16 are arranged on the four sides as shown in FIG. 2, and the connector case 12 is placed such as to surround the blow fan 4 that is arranged upon the center frame 7, after which the pack case 5, which consists of a right case 5a and a left case 5b, is closed, to complete the battery pack 1 shown in FIG. 1.

When this battery pack 1 is slidably attached to the electric tool A as shown in FIG. 9, the connector plugs 14 provided in the connector case 12 are connected to connector sockets provided in the electric tool A. When the starter switch of the electric tool A is turned on, the power supply circuit for supplying drive power to the electric tool A is closed. When the drive load of the electric tool A increases, the discharge rate of the rechargeable batteries 2 also increases, and the temperature rises. When the battery management circuit detects a predetermined temperature, it executes control to drive the blow fan 4, so that the rechargeable batteries 2 are cooled by blown air. Discharging of lithium ion rechargeable batteries is a heat-generating reaction, and a large current discharge required for the use of the electric tool A causes a rapid temperature rise of the rechargeable batteries 2. The battery management circuit controls the blow fan 4 such that the rechargeable batteries 2 are used in a temperature condition of not more than 60° C. In a high-temperature environment such as an outdoor environment on a hot summer day, in particular, it is well expected that the temperature of the rechargeable batteries 2 is over 40° C. even before use. Since the temperature rise during the use of the electric tool A is greater under such an environment, the battery management circuit drives the blow fan 4 to cool the rechargeable batteries 2 when their temperature is high whether or not the electric tool A is being used or not, and in the event that the temperature of the rechargeable batteries 2 exceeds 60° C., the battery management circuit executes control to stop power supply to the electric tool A and drives the blow fan 4 so as to decrease the temperature of the rechargeable batteries 2.

The blow fan 4 is structured as a suction fan for taking outside air into the pack case 5 by rotating, and blows the sucked-in air to the rechargeable batteries 2 to cool them. When the battery pack 1 is set in the electric tool A, the connector case 12 abuts on the battery pack attachment surface of the electric tool A. In the battery pack attachment surface of the electric tool A are formed apertures opposite the air inlet ports 32 of the connector case 12, and as shown in FIG. 9, outside air inlet ports a communicating with these apertures are formed in the side face of the electric tool A where the battery pack 1 is attached.

Figure 8:
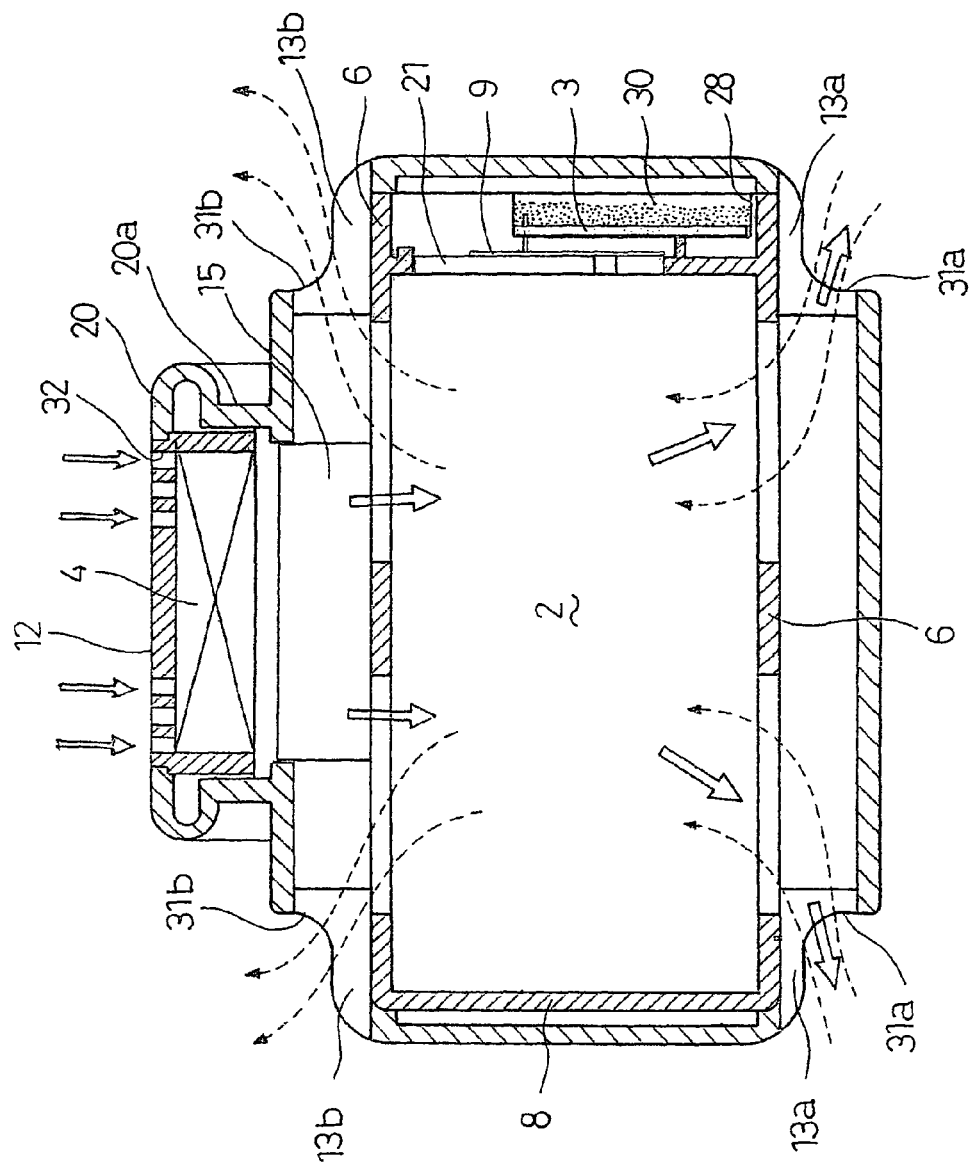
FIG. 8 is a cross-sectional view illustrating air passages formed around the rechargeable batteries.
Figure 9:
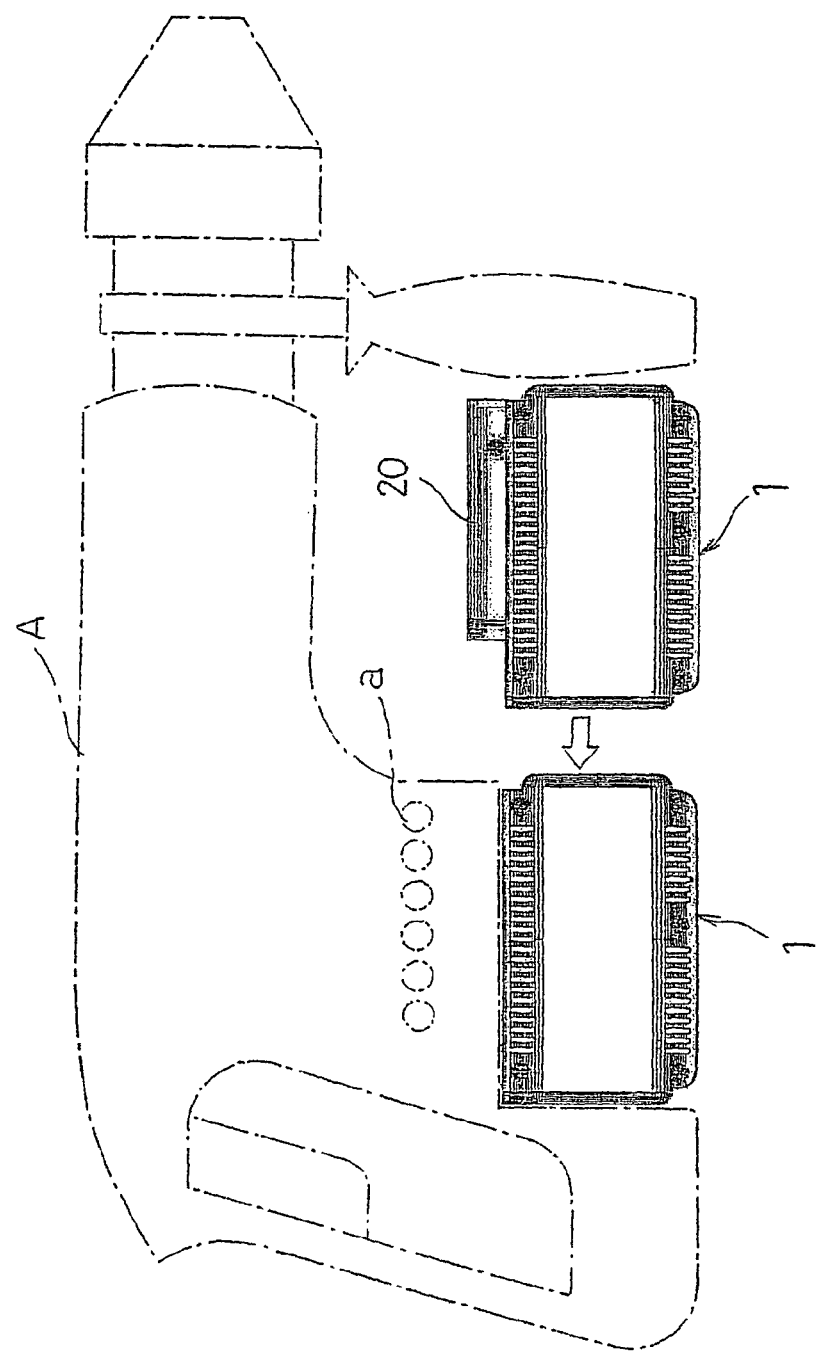
FIG. 9 is a side view for explaining how the battery pack is attached to an electric tool.

The blow fan 4 is arranged upon the center frame 7 inside the pack case 5, so that, as indicated by white arrows in FIG. 8, when the blow fan 4 is driven, air paths are formed wherein outside air sucked from the air inlet ports 32 passes through between parallel arranged, spaced apart rechargeable batteries 2 and exits from the lower vents 13a opened in the lower part of the pack case 5. The rechargeable batteries 2, whose temperature tends to rise due to the large current discharge for driving the electric tool A, are thereby cooled and the temperature rise is suppressed. A current adjusting plate 15 provided on the center frame 7 directs the current of air blown from the blow fan 4 to both sides so that the blown air is supplied not only to the rechargeable batteries 2 directly below the blow fan 4 but also to the rechargeable batteries 2 at both ends, whereby all of the rechargeable batteries 2 are evenly cooled. This current adjusting plate 15 may be formed with apertures with appropriately adjusted diameter and position, so as to adjust the air current to be supplied also to the rechargeable batteries 2 directly below the current adjusting plate 15, whereby the cooled state of each of the rechargeable batteries 2 is made even and the battery temperature is made equal.

The battery pack 1 is formed in such dimensions that when it is set in the electric tool A, as shown in FIG. 9, the lowermost part of the electric tool A and the bottom face of the battery pack 1 are level with each other, so that the electric tool A stands stably on a floor surface or the like. As shown in FIG. 8 in which the pack case 5 is sectioned in the lengthwise direction of the rechargeable batteries 2, the pack case 5 is formed with lower dents 31*a* on both sides in the bottom and upper dents 31*b* on both sides at the top, and the lower vents 13*a* and upper vents 13*b* are respectively formed in these lower and upper dents 31*a* and 31*b*. By these lower and upper dents 31*a* and 31*b*, the lower vents 13*a* are not closed when the electric tool A is placed upright, i.e., when the electric tool A is not operating, and as indicated by broken-line arrows, air currents are formed in which outside air that has flowed in from the lower vents 13*a* passes through between the rechargeable batteries 2 and exits from the upper vents 13*b*. After the electric tool A has been driven, in particular, the temperature of the rechargeable batteries 2 is high, and this heat causes an updraft towards the upper vents 13*b*, whereby air currents are formed in which outside air flows in from the lower vents 13*a*, passes through between the rechargeable batteries 2, and exits from the upper vents 13*b*. Thus the high-temperature rechargeable batteries 2 are efficiently cooled down even in a state where the blow fan 4 is stopped, and the temperature of the rechargeable batteries 2 is lowered quickly.

While the lower and upper vents 13*a* and 13*b* described above function effectively for the cooling of the rechargeable batteries 2, when the electric tool A is used in an environment with splashing water such as during rain, or when the electric tool A is placed on a floor surface with a puddle, there is a risk that water may enter through the lower and upper vents 13*a* and 13*b*. Even when water enters into the pack case 5, however, the sealing-plate side of each rechargeable battery 2 is surrounded by the terminal-side frame 6 and the circuit substrate 3 is covered by the resin mold 30 as shown in FIG. 8, and therefore water never enters into electrically active parts. Thus a necessary level of safety is ensured as the battery pack 1 for the electric tool A which is expected to be used under severe conditions.

When the battery capacity has decreased after using the electric tool A, the battery pack 1 is removed from the electric tool A and attached to the charger B as shown in FIG. 10, whereby the rechargeable batteries 2 are charged. When attached to the charger B, the battery pack 1 is mounted upside down on the charger B as shown, so that air inside the charger B is sucked from vents provided to the charger B at the position where the battery pack 1 is attached, for heat discharge of the charger B as well as for the cooling of the rechargeable batteries 2 being charged. An air exhaust fan may be provided on the side of the charger B, in which case it may be operated together with the blow fan 4 to blow air, for even more effective cooling.

It is well expected that the temperature of the rechargeable batteries 2 of the battery pack 1 that has been removed from the electric tool A immediately after use is higher than the temperature appropriate for the charging. The battery temperature is detected by the battery management circuit and also by other means on the side of the charger B through the connectors, and it is controlled such that, if the battery temperature is more than 45° C., the charging is not started, and the charging is started after a period of time during which cooling is performed with blown air until the temperature is 45° C. or lower.

While the battery pack 1 described above employs flat prismatic rechargeable batteries 2, it is possible to employ cylindrically formed rechargeable batteries, in which case also the similar effects as with the above-described embodiment will be achieved.

INDUSTRIAL APPLICABILITY

As described above, the present invention provides a structure wherein the plurality of rechargeable batteries are arranged in parallel and spaced apart from each other so as to promote cooling of the rechargeable batteries by air currents, and wherein the electrical circuit parts are covered by a resin mold and resistant to damage even when dust or water enters into the pack case through vents for taking in outside air into the pack case. In addition, since each rechargeable battery is electrically connected to the circuit substrate by a structure itself for integrating the plurality of rechargeable batteries and the circuit substrate into a one-piece block, there is no need to provide lead wires between each rechargeable battery and the circuit substrate. Also, because the major constituent elements are formed in a block, a rigid structure is simply formed only by accommodating this block in the pack case. Thus the present invention realizes a battery pack suitable as a battery power source of an electric tool or the like which is often used under severe conditions.

The invention claimed is:

1. A battery pack comprising: a plurality of prismatic rechargeable batteries, each of which is formed by accommodating an electrode assembly and a liquid electrolyte in a battery case and sealing an open end of the case with a sealing plate, an electrode terminal being provided in the sealing plate; a circuit substrate formed with a battery management circuit for managing the operating state of each rechargeable battery; and a pack case for accommodating the rechargeable batteries and the circuit substrate, wherein:

the plurality of rechargeable batteries are held by a frame in such an arrangement that the batteries are oriented in the same direction on their sealing-plate side, whereby the plurality of rechargeable batteries are integrated; the circuit substrate is mounted to the frame for holding the sealing-plate side of the plurality of rechargeable batteries; and a resin mold is provided for covering a necessary surface of the circuit substrate with a resin after the circuit substrate is electrically connected to the rechargeable batteries and to input and output terminals; and the plurality of rechargeable batteries are surrounded by the frame, the frame including a center frame having a plurality of battery accommodating openings, each battery accommodating opening having a shape and dimensions matching the cross section of the lengthwise center of the battery, the battery accommodating openings holding center parts of the batteries and arranging the rechargeable batteries in parallel spaced relationship; a bottom frame having bottom accommodating parts that receive bottoms of the rechargeable batteries; and a terminal side frame attached to the circuit substrate and having sealing part accommodating parts that receive sealing plate sides of the rechargeable batteries.

2. A battery pack comprising: a plurality of rechargeable batteries, each of which is formed by accommodating an electrode assembly and a liquid electrolyte in a battery case and sealing an open end of the case with a sealing plate, an electrode terminal being provided in the sealing plate; a circuit substrate formed with a battery management circuit for managing the operating state of each rechargeable battery; and a pack case for accommodating the rechargeable batteries and the circuit substrate, wherein:

the plurality of rechargeable batteries are held by a frame in such an arrangement that the batteries are oriented in the same direction on their sealing-plate side; the plurality of rechargeable batteries are connected in series and/or parallel by joining connection plates to the electrode terminals of each rechargeable battery; and the circuit substrate is mounted such that connection projections formed to the connection plates are inserted into connection holes of the circuit substrate so that the connection projections are joined to the circuit substrate; and the plurality of rechargeable batteries are surrounded by the frame, the frame including a center frame having a plurality of battery accommodating openings, each battery accommodating opening having a shape and dimensions matching the cross section of the lengthwise center of the battery, the battery accommodating openings holding center parts of the batteries and arranging the rechargeable batteries in parallel spaced relationship; a bottom frame having bottom accommodating parts that receive bottoms of the rechargeable batteries; and a terminal side frame attached to the circuit substrate and having sealing part accommodating parts that receive sealing plate sides of the rechargeable batteries.

3. The battery pack according to claim 1, wherein the rechargeable batteries are formed in a flat prismatic shape and held by the frame in parallel spaced relationship, largest flat surfaces of the batteries being directed opposite each other.

4. The battery pack according to claim 1, wherein the resin mold covers a surface on which electronic components are mounted, including electrically conductive parts.

5. The battery pack according to claim 1, wherein the resin mold is formed by filling a resin in a recess in which the circuit substrate is accommodated to cover the circuit substrate, the recess being located in the frame on the side of the sealing plate.

6. The battery pack according to claim 2, wherein the rechargeable batteries are formed in a flat prismatic shape and held by the frame in parallel spaced relationship, largest flat surfaces of the batteries being directed opposite each other.

* * * * *